A. PAUL.
BLADE SHARPENER.
APPLICATION FILED SEPT. 29, 1920.
1,388,882.
Patented Aug. 30, 1921.
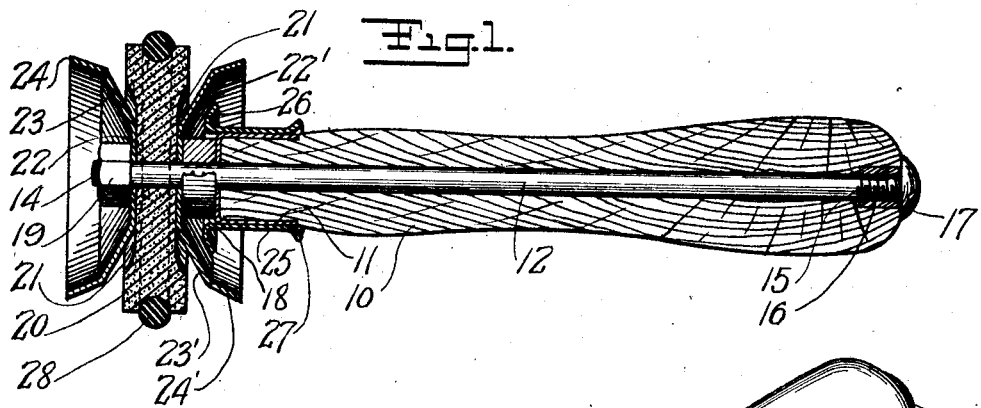
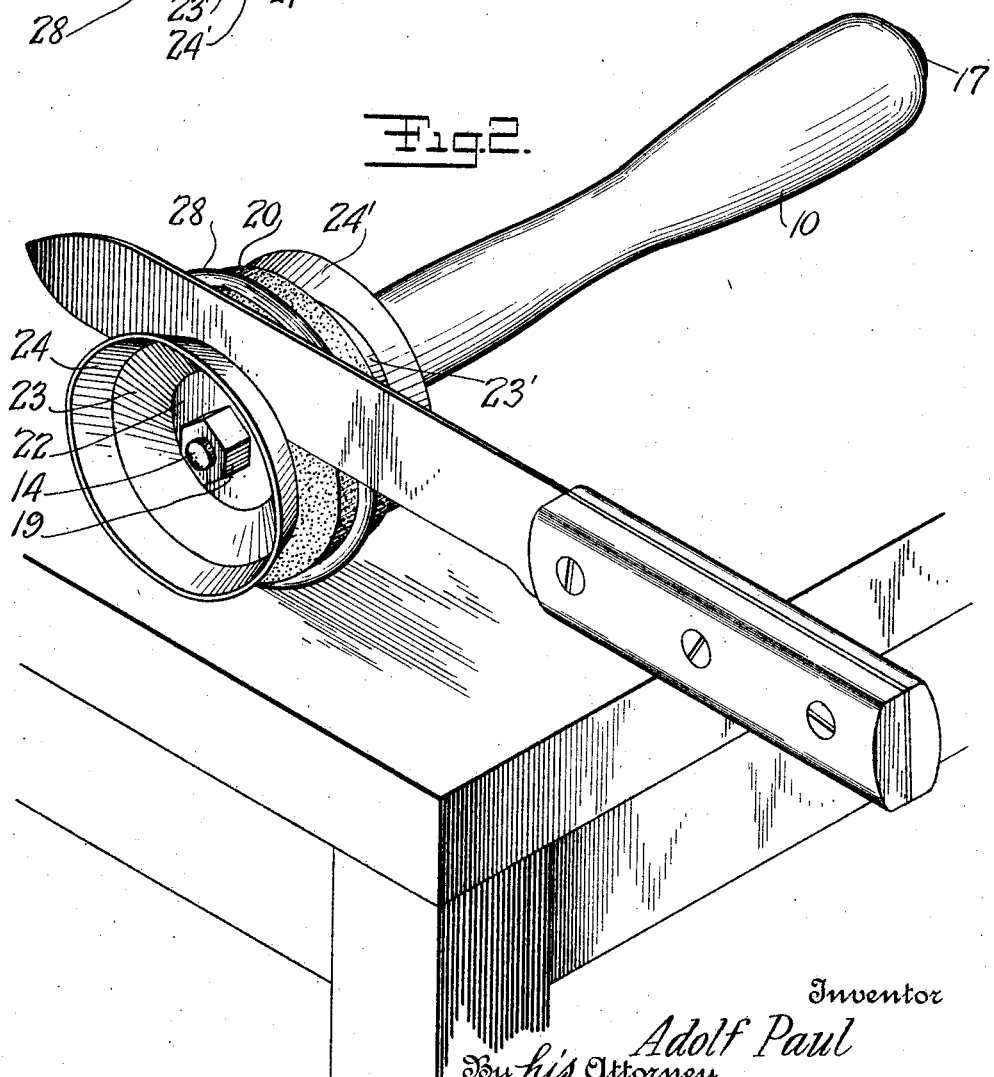
Inventor
Adolf Paul
By his Attorney
Charles L. Wright

UNITED STATES PATENT OFFICE.

ADOLF PAUL, OF BROOKLYN, NEW YORK.

BLADE-SHARPENER.

1,388,882.     Specification of Letters Patent.     Patented Aug. 30, 1921.

Application filed September 29, 1920. Serial No. 413,572.

*To all whom it may concern:*

Be it known that I, ADOLF PAUL, a citizen of the United States, residing in Brooklyn, in the county of Kings and State of New York, have invented certain new and useful Improvements in Blade - Sharpeners, of which the following is a specification.

The main object of this invention is to provide a sharpener for the blades of knives, shears and like cutting instruments, capable of convenient manual operation and highly effective in accomplishing its purpose in a rapid and satisfactory manner.

This object is achieved due to the novel design, construction and arrangement of elements hereinafter fully described and illustrated in the annexed drawings, forming an essential part of this inclosure, and in which:—

Figure 1 is a longitudinal sectional view taken through the center of a blade sharpener made in accordance with the invention.

Fig. 2 is a perspective view of the same illustrating the manner of its application.

Referring to the drawings in detail, the numeral 10 designates the handle of the implement, preferably made of wood, shaped to be comfortably grasped and provided with a tight fitting metal ferrule 11, its flange projecting over the end of the handle.

Passing centrally through the handle is a drilled opening containing a revoluble rod or bar 12 screw-threaded at its extremities 14 and 15 respectively, the end 15 being engaged in a nut 16 seated in a counterbored recess at the outer end of the handle and provided with a slotted head 17 by which it may be adjusted on the rod, the head extending at the end of the handle.

Secured to the rod immediately beyond the flanged portion of the ferrule 11, is a collar 18 and fitted to the adjacent end of the rod is a nut 19.

Mounted on the extending end of the rod 12 is an abrading disk made of stone, emery, carborundum or like material, having concave sides 21 tightly clamped between a pair of opposed guide elements made preferably of sheet metal formed to present flat disks respectively 22 and 22', pierced to suit the rod and integrally joined at their peripheries to beveled or conical walls 23 and 23' disposed at an angle of approximately thirty degrees to the adjacent faces of the stone 20, these walls being again bent outwardly at an angle of approximately sixty degrees, as at 24 and 24'.

As the collar 18 is fixed upon the rod and the stone and guides clamped tightly against it by the nut 19, it will be obvious that these parts move as a unit and rotate the rod within the handle.

A brake to prevent such rotation when preferred, is provided by the sleeve 25, formed with a reversely bent flanged end 26 adapted to engage the inner surface of the element 22', the sleeve being slidable on the exterior of the ferrule 11 by pressure applied to the raised annular edge 27 at the opposite end, such sliding motion being easily effected by the fingers of an operator when grasping the handle.

In order to cause the device to positively rotate when being used, as is desirable, the disk or stone 20 is grooved circumferentially at its center and an elastic ring 28 of rubber seated in the groove, so that as the implement is moved over a level surface, as indicated in Fig. 2, the friction of the ring or band upon the surface causes rotation of the parts, and furthermore prevents any possible damage to the surface with which it contacts.

In operation, the parts having been assembled, a blade is placed between the side of the stone and angular guide surface 23 or 23' and the handle of the blade, together with the handle of the implement, caused to move over any level surface as shown in Fig. 2, and it will be found in practice that a few passes suffice to sharpen the blade thoroughly.

As a final finish, the brake may be pressed into engagement with the guide, holding the parts quiescent and a smoothing pass made by the blade against the stone.

The beveled blades of shears and the like are similarly treated, but allowed to rest face down upon the guide surfaces 24 or 24' in a manner which will be well understood.

Having thus described the construction and application of the invention, what I claim as new and desire to secure by Letters Patent, is:—

1. A blade sharpener comprising a manually operable handle, a rod rotatably journaled therein, an abrading disk fixed on said rod and conical guides clamped on each side of said disk, said rod, disk and guides being rotated by frictional contact with a surface over which the sharpener is passed.

2. A blade sharpener comprising a handle, a rod rotatable longitudinally therein, an abrading disk fixed on the extending end of said rod, said disk having concave sides and conical guide elements formed with two distinct bevels clamped against the concave sides of said disk.

3. A blade sharpener comprising a ferruled handle, a rod rotatable longitudinally therein, a collar fixed on the extending end of said rod beyond the ferrule, a pair of opposed blade guide elements adjacent said collar, an abrading disk interposed between said guide elements, said disk having recessed sides, and a nut on said rod adapted to clamp said guides and disk against said collar.

4. A blade sharpener comprising a ferruled handle, a rod rotatable longitudinally therein, a collar fixed on the extending end of said rod beyond the ferrule, a pair of opposed blade guide elements adjacent said collar, an abrading disk interposed between said guide elements, each presenting two beveled surfaces to the sides of the disk, said disk having recessed sides against which said guides make contact, means on said rod for clamping said guides and disk against said collar, and means slidable on said ferrule adapted to act as a brake against one of said guides.

5. A blade sharpener comprising a handle having a rod journaled therein, a pair of opposed conic guides, an abrading disk having recessed sides between said guides, means for clamping said guides and disk on the extending end of said rod, and a flexible ring set in a groove formed circumferentially in said disk.

6. A blade sharpener comprising a handle having a rod journaled therein, a pair of opposed conic guides, an abrading disk having a thickened rim projecting over the inner ends of said guides, means for clamping said disk and guides to the rod, and means on the periphery of said disk adapted to cause it to rotate when passed over a surface.

7. A blade sharpener comprising a handle having a rod journaled therein, a pair of opposed conic guides, an abrading disk having a thickened rim projecting over the inner ends of said guides, means for clamping said disk and guides to the rod, a flexible friction band on said disk adapted to impart rotation when the implement is moved in a plane transverse to its axis in contact with a flat surface, and a braking means whereby said guides and disk may be prevented from rotating.

In testimony whereof I have signed my name to this specification.

ADOLF PAUL.